US007949787B2

(12) United States Patent
Box et al.

(10) Patent No.: US 7,949,787 B2
(45) Date of Patent: May 24, 2011

(54) OPEN CONTENT MODEL WEB SERVICE MESSAGING

(75) Inventors: Donald F. Box, Bellevue, WA (US); Christopher G. Kaler, Sammamish, WA (US); David E. Langworthy, Kirkland, WA (US); Steven E. Lucco, Palo Alto, CA (US); John Shewchuk, Redmond, WA (US); Luis Felipe Cabrera, Bellevue, WA (US); Craig A Critchley, Fall City, WA (US); Geary L. Eppley, Carnation, WA (US); Bradford H. Lovering, Seattle, WA (US); Jeffrey C. Schlimmer, Redmond, WA (US); David Wortendyke, Seattle, WA (US); Henrik F. Nielsen, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 10/801,999

(22) Filed: Mar. 15, 2004

(65) Prior Publication Data

US 2005/0204051 A1    Sep. 15, 2005

(51) Int. Cl.
G06F 15/16 (2006.01)
(52) U.S. Cl. ........................................ 709/245
(58) Field of Classification Search .................. 709/230, 709/238, 245; 719/328
See application file for complete search history.

(56) References Cited

U.S. PATENT DOCUMENTS

| | | | | |
|---|---|---|---|---|
| 6,732,175 | B1* | 5/2004 | Abjanic | 709/227 |
| 6,980,993 | B2* | 12/2005 | Horvitz et al. | 707/102 |
| 7,017,162 | B2* | 3/2006 | Smith et al. | 719/328 |
| 7,047,243 | B2* | 5/2006 | Cabrera et al. | 707/10 |
| 7,117,504 | B2* | 10/2006 | Smith et al. | 719/328 |
| 7,200,675 | B2* | 4/2007 | Wang et al. | 709/238 |
| 7,254,579 | B2* | 8/2007 | Cabrera et al. | 707/10 |
| 7,302,634 | B2* | 11/2007 | Lucovsky et al. | 707/10 |
| 7,496,672 | B2* | 2/2009 | Orton et al. | 709/230 |
| 7,568,222 | B2* | 7/2009 | Randle et al. | 726/8 |
| 2002/0143944 | A1 | 10/2002 | Traversat et al. | |
| 2002/0152106 | A1* | 10/2002 | Stoxen et al. | 705/8 |
| 2003/0005181 | A1* | 1/2003 | Bau et al. | 709/330 |
| 2004/0019645 | A1 | 1/2004 | Goodman et al. | |
| 2005/0021836 | A1 | 1/2005 | Reed et al. | |
| 2005/0144298 | A1 | 6/2005 | Samuel et al. | |
| 2005/0182843 | A1* | 8/2005 | Reistad et al. | 709/230 |
| 2005/0204051 | A1* | 9/2005 | Box et al. | 709/230 |
| 2007/0204279 | A1* | 8/2007 | Warshavsky et al. | 719/330 |

OTHER PUBLICATIONS

Adam Bosworth et al., "Web Services Addressing (WS-Addressing)", submitted to W3C on Mar. 13, 2003.*
Luis Felipe Cabrera et al., "Web Services Coordination (WS-Coordination)", Sep. 2003.*
Donald F. Ferguson et al., "Secure, Reliable, Transacted Web Services: Architecture and Composition", Sep. 2003.*

* cited by examiner

*Primary Examiner* — Kevin Bates
*Assistant Examiner* — Shirley X Zhang
(74) *Attorney, Agent, or Firm* — Lee & Hayes, PLLC

(57) ABSTRACT

Systems and methods for open content model Web service messaging in a networked computing environment are described. In one aspect, a transport neutral message is generated that includes message recipient, endpoint addressing information, and one or more reference properties. The reference properties include selectively opaque message context. The transport neutral message is bound to a transport protocol for communication to the message recipient. At least a portion of the selectively opaque message context is not directed to the message recipient.

24 Claims, 4 Drawing Sheets

OPEN CONTENT MODEL WEB SERVICE MESSAGING

TECHNICAL FIELD

The following subject matter pertains to network communications.

BACKGROUND

In many scenarios messages are targeted directly to a Web service. In such a scenario, the message addressing information can be described simply using a GUID or URL of the service (service address), the address of the message sender is identified by the transport mechanism (e.g., TCP/IP, HTTP, etc.) being used to send the message. For example, a client service might send a request to a printing service and receive an acknowledgement that that the request was received. At a later point in time the printing service might want to notify the client service that the printing request has been serviced. Using conventional request/response addressing mechanisms, such as a transport-based binding to Simple Object Access Protocol (SOAP) to leverage the transport's request/response mechanism to carry the response, addressing information needed to send a message back to the client service is available until the transport channel closes. The printing service of this example can generally use this addressing information to send a request back to the intended recipient.

In practice, however, a service or other entity within the service often needs to target a message to specific elements or resources within a Web service wherein the target address is not so simply provided by the a message transport's request/response mechanism. For instance, in the above example of the printing service, if the client service wants the printing service to notify a third party (independent from the client service) when a printing request has been serviced, the address of the third party is generally communicated to the service independent of the messaging transport response/request mechanism. Such non-standard addressing information is typically encoded in an ad-hoc manner within a GUID or URL of the service. Unfortunately, embedding addressing information within the GUID or URL of the service is substantially limited and problematic.

One limitation, for example, is that serialization of addressing information within a 128-bit GUID or URL substantially restricts the format and quantity of the additional information being conveyed. Additionally, when non-standard data is serialized into a service GUID or URL of the service, the service must share a common set of assumptions with the message originator about how the non-standard data is to be parsed or extracted from the GUID or URL of the service, and subsequently managed. Such tight coupling between components is undesirable because tightly coupled components are generally more expensive and time consuming to create and maintain. This example illustrates that conventional Web service messaging techniques do not provide a satisfactory technique to identify specific elements within a service that send or should receive a message, wherein the elements cannot be simply defined by a standard request/response messaging paradigm.

The immediately preceding limitation and problem of ad-hoc encoding of non-standard addressing information into a service GUID or URL is directly related to another problem of conventional Web service communications. The related problem surfaces when a message originator wants to a service coordinator (e.g., an event source) to add context to a message targeted to a service recipient (e.g., an event sink as part of an event notification subscription, a gateway, firewall, etc). As with addressing information that does not fall neatly into the request/response transport messaging mechanism, message context is also typically encoded in an ad-hoc manner within the GUID or URL of the service. Such ad-hoc embedding of context into a GUID or URL data field has all of the limitations and problems associated with ad-hoc encoding of non-standard addressing information in such a data field—restricted format and quantity of the context being conveyed and the need to share common assumptions between components resulting in undesirably tight coupling between the parsing entity and the message originator. This example illustrates that conventional Web service messaging techniques do not provide a satisfactory technique to communicate message context to message recipients.

To make matters worse, every time the amount and/or the data format of such non-standard embedded data (addressing information, context, etc.) changes, it is likely that the service will need to be modified to properly parse and extract the new context style from the GUID or URL of the service address. These and other problems of conventional network communications are addressed by the following systems and methods for open content model Web service messaging.

SUMMARY

Systems and methods for open content model Web service messaging in a networked computing environment are described. In one aspect, a transport neutral message is generated that includes message recipient, endpoint addressing information, and one or more reference properties. The reference properties include selectively opaque message context. The transport neutral message is bound to a transport protocol for communication to the message recipient. At least a portion of the selectively opaque message context is not directed to the message recipient.

BRIEF DESCRIPTION OF THE DRAWINGS

In the figures, the left-most digit of a component reference number identifies the particular figure in which the component first appears.

DETAILED DESCRIPTION

Overview

Figure 1:
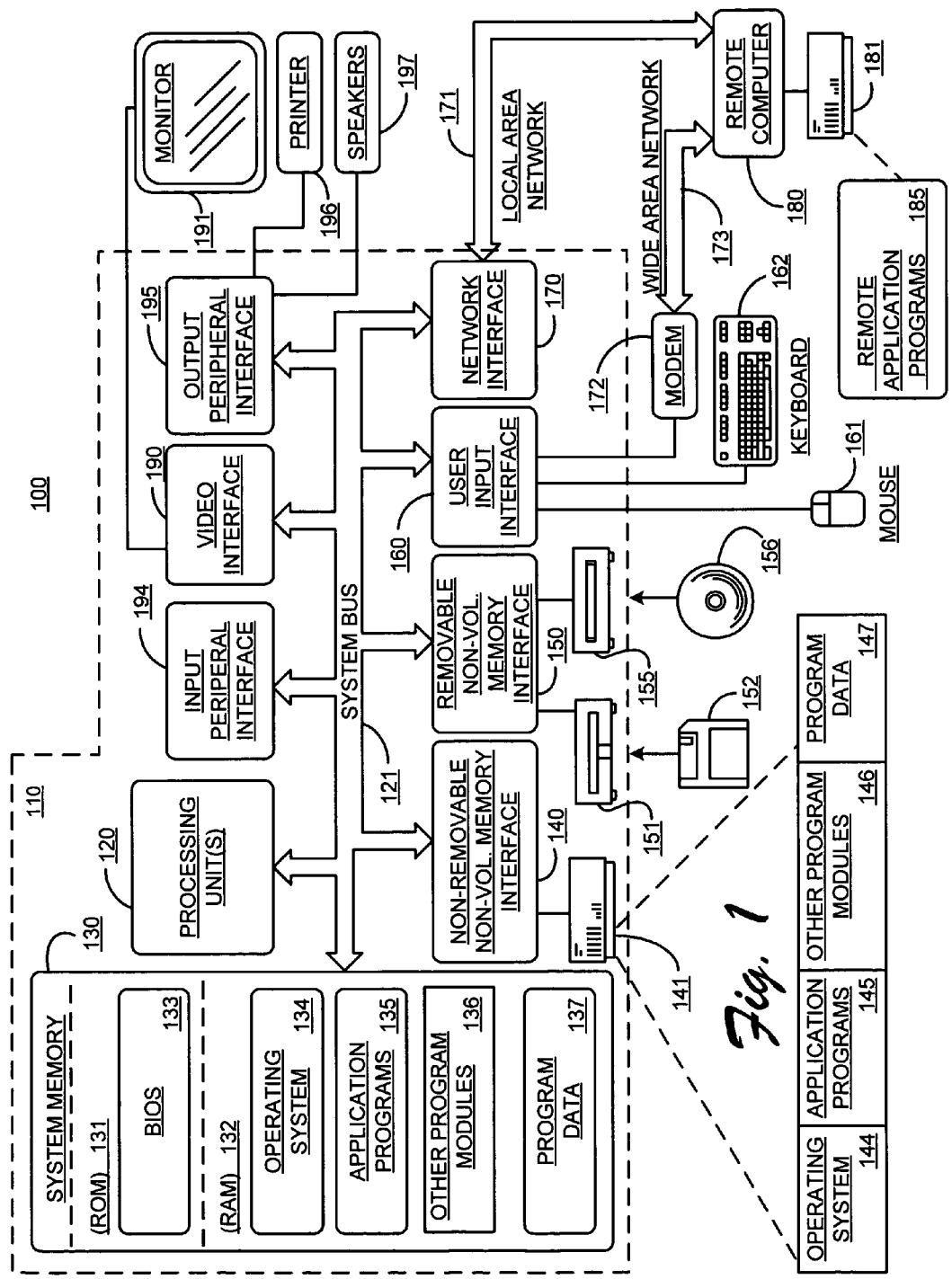
FIG. 1 illustrates an example of a suitable computing environment for open content model Web service messaging ("OCM-Messaging") may be fully or partially implemented.

The following exemplary systems and methods for open content model (OCM) addressing provide solutions to the limitations of conventional network communications described above in the background section. To this end, the systems and methods provide an interoperable, transport independent approach to communicating selectively opaque message context to a message originator/source, message senders, and/or message receivers. This includes a fine grained approach to identifying specific elements within a service that originate, send, or should receive a message.

More particularly, open content data fields are embedded into a lightweight XML-based messaging protocol (e.g., a SOAP envelope) used to encode information in a message before it is send over a network. Open content data fields include, for example, a reference properties element (ReferenceProperties) for providing a message recipient with additional information (e.g., context, private data, etc.) that a message originator/source, which may not have been the sender of the message, would like to correlate with the response, a reply endpoint property (ReplyTo) identifying an intended recipient for a reply to the transport neutral message—which may not be the message sender, a fault endpoint property identifying an intended receiver for a fault related to the message, a relates-to element (RelatesTo) identifying a relationship type to the message recipient, and so on.

With respect to the reply endpoint property, each message includes a message identifier in a MessageID information header. A follow-on or subsequent message may contain a RelatesTo information header (e.g., see information header(s) 204 of FIG. 2). RelatesTo includes the message identifier of the original message, but may also include an indicator of the relationship between the original message and the follow-on message. A common relationship type is 'reply', indicating that the original message was a request and the follow-on message is a response (analogous to the request-response pattern exposed by HTTP). Since the set of relationships is extensible/open-ended, other relationship types are possible; for example, the follow-on message may be an acknowledgement that the original message was received, an indicator that the original message was logged, a partial response, a challenge the sender of the original message must answer before the original message is processed, etc.

As opposed to ad hoc encoding such information into a GUID or URL element of a message, these enhancements to the messaging model provide a structured way in which arbitrary amounts of information can be used by the sender of a message to identify what is to happen to the reply of a message, or to a large collection of messages sent "under a session". The degrees of flexibility include changing this information over time, so it could even be made to apply on a message-by-message basis, and having it be selectively opaque to zero or more of all the processing intermediaries. This in turn enables Web services to be used to support many business scenarios.

For example, certain banking tasks require human review for approval at certain steps. There are usually many active instances of the task at any point in time. OCM-Messaging provides a general mechanism to associate incoming or outgoing messages with specific tasks. The mechanism that the service uses is transparent to those using the service through an endpoint reference. The endpoint reference further allows messaging entities to insert selectively opaque context information into messages. Such context is transparent to a targeted entity and selectively opaque to others; context opacity being a function of message content design. The targeted entity may include the recipient of the request message, and/or other entities (e.g., intermediaries, event sinks, etc.) in a communications network (e.g., a publish-and-subscribe ("pub-sub") system) that receive message(s) associated with the request message.

In one implementation, selectively opaque context is state information (e.g., a purchase order or a transaction identifier) that is private to the message originator for returning by an end point to the message originator. In another implementation, selectively opaque context is used to support internal state integrity. For example, context may be sent out, that upon return, is used to determine whether data corruption of the message has occurred. Such context may be a cyclical redundancy check value of application-specific data that can subsequently be used by the message originator to re-compute the cyclical redundancy check of data returned to the originator in a response from an intermediary or an endpoint to determine data validity.

These and other aspects of the systems and methods for open content model Web service messaging are now described in greater detail.

An Exemplary Operating Environment

FIG. 1 illustrates an example of a suitable computing environment 100 for open content model Web service messaging ("OCM-Messaging") may be fully or partially implemented. Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to Web Service environments that comprise networked computing devices such as personal computers, server computers, multiprocessor systems, microprocessor-based systems, network PCs, minicomputers, mainframe computers, distributed computing environments that include any of the above systems or devices, intermediaries such as gateways, routers, endpoint managers, etc. Compact or subset versions of the framework may also be implemented in clients of limited resources, such as handheld computers, or other computing devices. The invention is practiced in a distributed computing environment where tasks are performed by remote processing devices (e.g., devices implementing a Web service, etc.) that are linked through a communications network. In a distributed computing environment, program modules may be located in both local and remote memory storage devices.

With reference to FIG. 1, an exemplary system providing content propagation for open content model Web service messaging includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules for generating, interpreting, and/or responding to messages based on OCM-Messaging, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures or program modules Combinations of any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

Exemplary program modules 135 and/or 136, and program data 137 include one or more computer-program modules and program data 137 for generating, interpreting, and/or responding to messages based on OCM-Messaging. A particular computing device 110 program module and data implementation is a function of the role of the respective computing device in system 100. Such roles include, for example, publish/subscribe system components roles, for instance, those implemented by a subscriber, event source, intermediary, event sink, and/or topic service. In another example, computing device 110 may also implement a role of a vertical and portal service, an application specific Web service, a building block Web service, a system 100 client, and so on. Accordingly, the type of role implemented by a computing device 110 that generates, interprets, and/or responds to messages based on OCM-Messaging in system 100 is a function of the computing device's role in system 100.

Computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 1130, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Computing device 110 operates in a networked environment using logical connections to one or more remote computers, such as a remote computer 180. In this implementation, the remote computer 180 may be a subscriber, event source, intermediary, event sink, Web service, Web service client, etc. Remote computer 180 typically includes many or all of the elements described above relative to the computer 110, although only a memory storage device 181 has been illustrated in FIG. 1. The remote computer 180 may also be a personal computer, a server, a router, a network PC, a peer device or other common network node. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

OCM-Messaging

To illustrate how the OCM-Messaging mechanism in a computer 110 and/or remote computing device 180 operates, consider the following example of TABLE 1. TABLE 1 shows a standard SOAP 1.2 message that is being sent to submit a purchase order. For purposes of discussion, one or more of the following arbitrary and non-semantically significant namespace prefixes are used in the following TABLES 1 through 9: "S"—a soap envelope; "ocmm"—OCM-Messaging; "tmdp"—OCM-Policy; and, "xs"—XML Schema.

TABLE 1

A STANDARD SOAP MESSAGE

| | |
|---|---|
| (001) | `<S:Envelope xmlns:S="http://www.w3.org/2002/12/soap-envelope">` |
| (002) | `<S:Header>` |
| (003) | `</S:Header>` |
| (004) | `<S:Body xmlns:po="http://schemas.microsoft.com/examples/2003/05/PurchaseOrder">` |
| (005) | `<po:PurchaseOrder>` |
| (006) | ... |
| (007) | `</po:PurchaseOrder>` |
| (008) | `</S:Body>` |
| (009) | `</S:Envelope>` |

Lines (002) to (003) show an empty SOAP header; lines (004) to (009) represent the body of the message. This conventional message of TABLE 1 can be sent to a Web service by using any transport protocol, in particular HTTP. For example, the service endpoint might be http://fabrikam123.com/Purchasing and the message sent with a SOAP action of http://fabrikam123.com/SubmitPO.

Referring to TABLE 2, the HTTP request appears as follows on the wire:

TABLE 2

A CONVENTIONAL HTTP REQUEST

```
POST /Purchasing HTTP/1.1
Host: fabrikam123.com
Content-Type: text/xml; charset=utf-8
Content-Length: 99999
SOAPAction: "http://fabrikam123.com/SubmitPO"
<?xml version="1.0" encoding="utf-8"?>
<S:Envelope xmlns:S="http://www.w3.org/2002/12/soap-envelope">
  <S:Header>
  </S:Header>
  <S:Body xmlns:po=
      "http://schemas.microsoft.com/examples/2003/05/PurchaseOrder">
    <po:PurchaseOrder>
    ...
    </po:PurchaseOrder>
  </S:Body>
</S:Envelope>
```

There are several interesting characteristics of this message of TABLE 2 as it is transmitted over HTTP.

- Both the target address and the SOAP action are encoded as HTTP headers. Specifically, the Host header combined with the value following the POST verb encode the target address, and the SOAP action is encoded as a distinct SOAPAction HTTP Header.
- There is no return address specified at the HTTP layer. The open HTTP channel is expected to deliver the response. Note, however, that at the TCP/IP layer the packets contain the source IP address.

In contrast to the addressing used in TABLES 1 and 2, a message generated based on OCM-Messaging of computer 110 and/or remote computer 180 comprises two constructs to convey transport protocol information in an interoperable manner. These constructs normalize the transport protocol information into a uniform format that is processed independently of transport or application. The two constructs are endpoint reference(s) and message information header(s). An exemplary message comprising these constructs is shown below in TABLE 3, which represents an exemplary SOAP message with OCM-Messaging ("ocmm") fields included.

TABLE 3

AN EXEMPLARY OPEN CONTENT MODEL MESSAGE

| | |
|---|---|
| (001) | `<S:Envelope xmlns:S="http://www.w3.org/2002/12/soap-envelope" xmlns:ocmm="http://schemas.xmlsoap.org/ws/2003/03/addressing">` |
| (002) | `<S:Header>` |
| (003) | `<ocmm:From>` |
| (004) | `<ocmm:Address>http://business456.com/OrderMgr</ocmm:Address>` |
| (005) | `</ocmm:From>` |
| (006) | `<ocmm:ReplyTo>` |
| (007) | `<ocmm:Address>http://business456.com/OrderMgr</ocmm:Address>` |
| (008) | `<ocmm:ReferenceProperties>` |
| (009) | ... |
| (010) | `</ocmm:ReferenceProperties>` |
| (011) | `</ocmm:ReplyTo>` |
| (012) | `<ocmm:To>http://fabrikam123.com/Purchasing</ocmm:To>` |
| (013) | `<ocmm:Action>http://fabrikam123.com/SubmitPO</ocmm:Action>` |
| (014) | `</S:Header>` |
| (015) | `<S:Body xmlns:po="http://schemas.microsoft.com/examples/2003/05/PurchaseOrder">` |
| (016) | `<po:PurchaseOrder>` |
| (017) | ... |
| (018) | `</po:PurchaseOrder>` |
| (019) | `</S:Body>` |
| (020) | `</S:Envelope>` |

TABLE 3 shows an exemplary self-contained and transport neutral SOAP 1.2 message that is being sent from http://business456.com/OrderMgr to http://fabrikam123.com/Purchasing with a SOAP action of http://fabrikam123.com/SubmitPO. In particular, lines (003) to (010) of TABLE 3 comprise the OCM-Messaging message information headers. Specifically, lines (003) to (005) specify the source endpoint of the message. Lines (006) to (011) specify the endpoint reference to which replies to this message should be sent, and a ReferenceProperties element for providing a message recipient with additional information (e.g., context, private data, etc.) that the original sender would like to correlate with the response. Line (012) specifies the address URI of the ultimate recipient (endpoint) of this message. Line (013) specifies an Action URI identifying expected semantics. Lines (015) to (019) represent the body.

Figure 2:
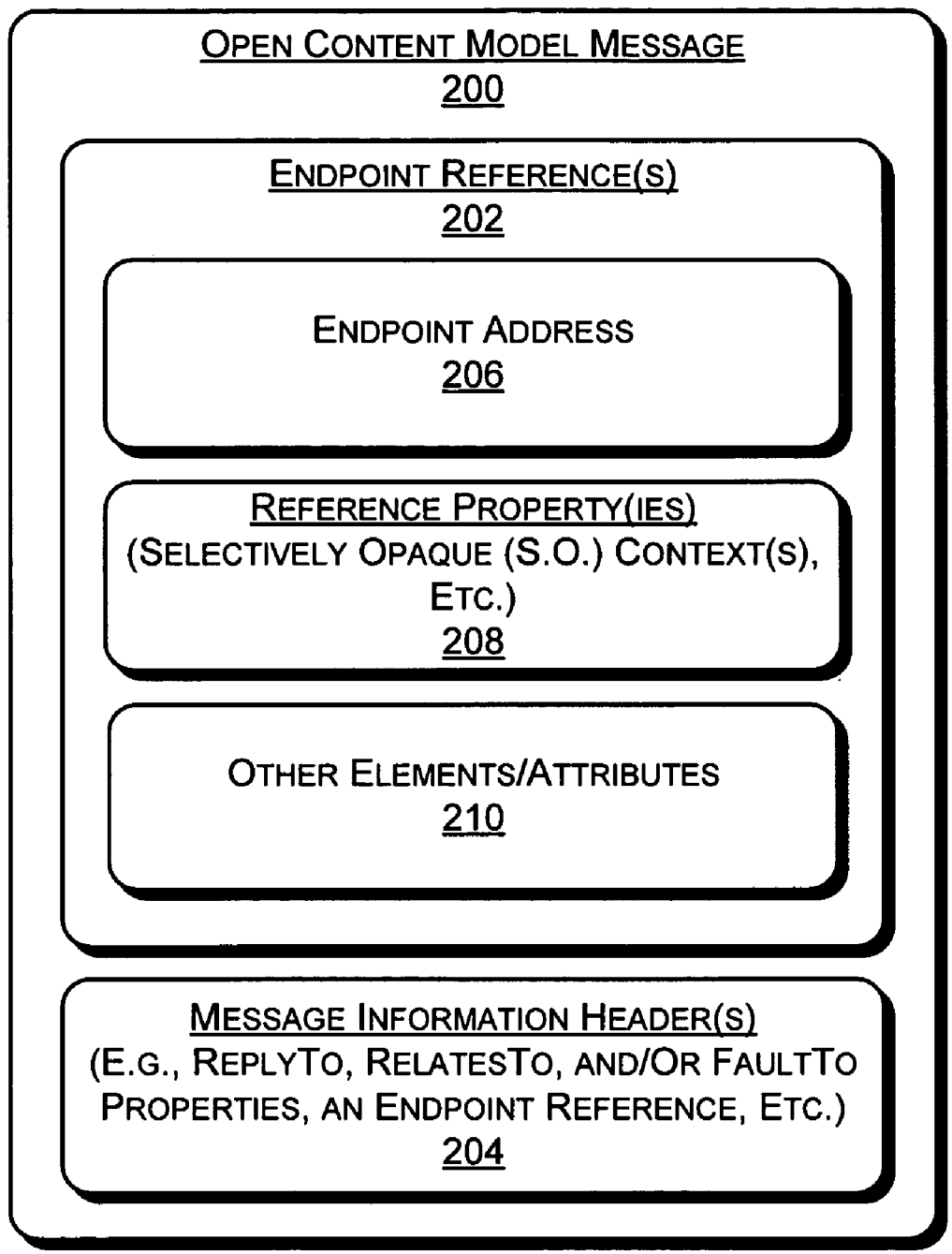
FIG. 2 shows an exemplary structure for a transport neutral (i.e., transport model decoupled) message that has been generated based on OCM-Messaging of a computing device.

FIG. 2 shows an exemplary structure for a, open content model (OCM) message 200 generated based on OCM-Messaging of a computing device 110. For purposes of correlation with the system 100 of FIG. 1, transport neutral (TN) message 200 is represented by a respective portion of program data 137 of FIG. 1. (The message of TABLE 3 is an example of a TN message 200). TN message 200 comprises endpoint reference(s) 202 and message information header(s) 204. An endpoint reference 202 supports a set of dynamic usage patterns not currently available through conventional Web Service Description Language(s) ("WSDL"). Endpoint reference 202 use, for example, allows for: Dynamic generation and customization of lightweight, self-contained service endpoint descriptions. Such descriptions allow communicating parties to flexibly and dynamically exchange information, even in tightly coupled environments. For purposes of discussion, a tightly coupled environment is one wherein communicating parties share a set of common assumptions about specific policies or protocols or processing environment. An example of such dynamic generation and use of an endpoint reference can be found in U.S. patent application Ser. No. 10/801,998, titled "Using Endpoint References in a Publish/Subscribe System", filed on Mar. 15, 2004, commonly assigned hereto, and hereby incorporated by reference. In one implementation, details of endpoint configuration may be shared by communicating parties, but specific policy information is added or updated, for instance, as a result of a dynamic configuration process, via an endpoint reference.

Identification and description of specific service instances that are created as the result of stateful interactions, and/or transmitting instance specific configuration details. Such stateful interactions include, for example, the processing of a credit card validation request in the context of a multi-item purchase, or the processing of the reservation of an airplane flight and seat assignment in the context of a trip itinerary.

An Exemplary Endpoint Reference Structure

Endpoint reference 202 comprises at least a subset of the following abstract properties:

- [address]: An endpoint address 206 comprising a Universal Resource Identifier (URI) of an endpoint. In this implementation, the address is a network address or a logical address.
- [reference properties]: xs:any (0 . . . unbounded)—A reference property 208 that may contain one or more individual properties to identify an entity (e.g., subscriber, selectively opaque context, etc.) or resource (e.g., message, etc.) being conveyed. In one implementation, reference properties identification aspects selectively dispatch context to the endpoint at the endpoint side of the interaction and/or any intermediaries.
- [any other elements or attributes]—"Other elements/attributes" 210 include, for example:
  - [selected port type]: a QName of a primary portType of the endpoint being conveyed.
  - [service-port]: (QName, NCName (0 . . . 1))—This is a QName identifying a WSDL service element that contains a definition of the endpoint being conveyed. The service name provides a link to a full description of the service endpoint. In one implementation, a non-qualified name identifies the specific port in the service that corresponds to the endpoint.
  - [policy]: tmdp:policy (0 . . . unbounded)—A configurable number of transport independent XML policy elements describing behavior, requirements, and/or capabilities of the endpoint. Policies may be included in an endpoint.

In one implementation, an information header 212 is a type of endpoint reference 202. For example, a ReplyTo or FaultTo information header 212 that identifies the creator of the endpoint reference as the entity to receive a message is a type of an endpoint reference 202. Thus, even though the exemplary implementation of FIG. 2 shows endpoint reference 202 as an independent entity from an information header 204, an information header 204 may be an endpoint reference 202.

An Exemplary Endpoint Reference Information Model

This section defines an exemplary information model, or schema, for enforcing and parsing structure and content an endpoint reference (EPR) 202 of FIG. 2. A respective portion of program data 137 represents such a schema. The exemplary schema of TABLE 4 enforces representation of an EPR 202 as an XML type (ocmm:EndpointReferenceType) and as an XML element (<ocmm:EndpointReference>). For purposes of discussion, "?" and "*" respectively represent one (1) of more instances, and zero (0) or more instances.

TABLE 4

AN EXEMPLARY SCHEMA FOR AN ENDPOINT REFERENCE

```
<ocmm:EndpointReference>
    <ocmm:Address>xs:anyURI</ocmm:Address>
    <ocmm:ReferenceProperties> ... </ocmm:
    ReferenceProperties> ?
    <ocmm:PortType>xs:QName</ocmm:PortType> ?
    <ocmm:ServiceName
PortName="xs:NCName"?>xs:QName</ocmm:ServiceName> ?
    <tmdp:Policy/> *
</ocmm:EndpointReference>
```

In this implementation, exemplary attributes and elements of the schema of TABLE 4 include, for example:

- /ocmm:EndpointReference—This represents an element of type ocmm:EndpointReferenceType. This example uses a predefined <ocmm:EndpointReference> element, but any element of type ocmm:EndpointReferenceType may be used.
- /ocmm:EndpointReference/ocmm:Address—This element (of type xs:anyURI) specifies the [address] property of the endpoint reference. This address may be a logical address or identifier for the service endpoint.
- /ocmm:EndpointReference/ocmm:ReferenceProperties/—This element contains elements that convey the [reference properties] of the reference. As described below, such reference properties are selectively opaque to processing nodes. For example, they can be designed to be opaque to certain pub-sub system 100 components and transparent to other pub-sub components such as network gateways.
- /ocmm:EndpointReference/ocmm:ReferenceProperties/{any}—Each child element of ReferenceProperties represents an individual [reference property].
- /ocmm:EndpointReference/ocmm:PortType—This element (of type xs:Qname) specifies the value of the [selected port type] property of the endpoint reference.
- /ocmm:EndpointReference/ocmm:ServiceName—This element (of type xs:QName) specifies the <wsdl:service> definition that contains a WSDL description of the endpoint being referenced.
- /ocmm:EndpointReference/ocmm:ServiceName/@PortName—This attribute (of type xs:NCName) specifies the name of the <wsdl:port> definition that corresponds to the endpoint being referenced.
- /ocmm:EndpointReference/tmdp:Policy—This element specifies a policy that is relevant to the interaction with the endpoint.
- /ocmm:EndpointReference/{any}—This is an extensibility mechanism to allow additional elements to be specified.
- /ocmm:EndpointReference/@{any}—This is an extensibility mechanism to allow additional attributes to be specified.

Although the schema of TABLE 4 has been described with a certain number and type of attributes and elements, the number and type of elements may change as a function of implementation design. For instance, in one implementation, ocmm:PortType, ocmm:ServiceName, ocmm:ServiceName/@PortName, and/or tmdp:Policy elements and attributes of the schema are optional.

Binding Endpoint References

When a message 200 is addressed to an endpoint (e.g., remote computer 180 of FIG. 1), the information contained in the endpoint reference 202 is mapped within the message according to a transformation that is dependent on the protocol and data representation used to send the message. Protocol specific mappings (or bindings) indicate how the information in the endpoint reference is copied to message and protocol fields. In this implementation, and as shown above in TABLE 3, a SOAP binding is used for endpoint references. In another implementation, this mapping is replaced by other bindings, for example, a WSDL binding, or as policies.

In this implementation, a computer 110 performs endpoint reference binding according to the following exemplary criteria:

The [address] property in the endpoint reference 202 is copied in the [destination ("To")] header field of the message 200.

Each [reference property] element of the endpoint reference 202 becomes a header block for a respective information message header 204 in the message 200. The element information item of each [reference property] (including all of its [children] and [in-scope namespaces]) is to be added as a header block in the new message 200.

The examples of TABLE 6 and 7 show how a SOAP binding for endpoint references 202 is used to construct a message 200 addressed to an endpoint:

TABLE 6

AN EXEMPLARY ENDPOINT REFERENCE

```
<ocmm:EndpointReference xmlns:ocmm="..." xmlns:fabrikam="...">
    <ocmm:Address>http://www.fabrikam123.com/acct</ocmm:
    Address>
    <ocmm:ReferenceProperties>
        <fabrikam:CustomerKey>123456789</fabrikam:CustomerKey>
    </ocmm:ReferenceProperties>
</ocmm:EndpointReference>
```

Referring to TABLE 6, the address value (endpoint address 206) is copied in the "To" header and the "CustomerKey" element (a reference property 208) is copied literally as a header 204 in a SOAP message addressed to the endpoint. A resulting SOAP message 200 is shown in TABLE 7

TABLE 7

AN EXEMPLARY ENDPOINT REFERENCE BINDING

```
<S:Envelope xmlns:S="http://www.w3.org/2002/12/soap-envelope"
        xmlns:fabrikam="... ">
    <S:Header>
        ...
        <ocmm:To>http://www.fabrikam123.com/acct</ocmm:To>
        <fabrikam:CustomerKey>123456789</fabrikam:CustomerKey>
        ...
    </S:Header>
    <S:Body>
        ...
    </S:Body>
</S:Envelope>
```

Message Information Headers

This section shows an exemplary model and syntax of a message information header 204 of FIG. 2. Message information headers collectively augment a message 200, for example, with one or more of the following exemplary abstract properties:

[destination]: URI—The address of the intended receiver of this message.

[recipient]: endpoint reference—Endpoint reference of the intended receiver of this message.

[source endpoint]: endpoint reference—Reference of the endpoint where the message originated from.

[reply endpoint]: endpoint reference—An endpoint reference that identifies the intended receiver for replies to this message. In one implementation, when formulating a reply message, the sender may use the contents of the [reply endpoint] of the message being replied to formulate the reply message. If the [reply endpoint] is absent, the sender may use the contents of the [source endpoint] to formulate the reply message. This property may be absent if the message has no meaningful reply (e.g., is a one-way application message), or when the reply endpoint has already been communicated to the target by other means. In one implementation, if the [reply endpoint] contains embedded policy, that policy is a complete policy for that endpoint.

([fault endpoint]: endpoint reference—An endpoint reference that identifies the intended receiver for faults related to this message. In one implementation, when formulating a fault message, the sender uses the contents of the [fault endpoint] of the message being replied to formulate the fault message. If the [fault endpoint] is absent, the sender may use the contents of the [reply endpoint] to formulate the fault message. If both the [fault endpoint] and [reply endpoint] is absent, the sender may use the contents of the [source endpoint] to formulate the fault message. This property may be absent if the sender cannot receive fault messages (e.g., is a one-way application message). In one implementation, if the [fault endpoint] contains embedded policy, that policy must be the complete policy for that endpoint.

[action]: URI—An identifier that uniquely (and opaquely) identifies the semantics implied by this message. In one implementation, the value of the [action] property is a URI corresponding to an abstract WSDL construct (e.g., message, operation, port type available at the destination endpoint). In this case, the "relates to" property determines if the action is a request or response (the "direction" of the message). In this implementation, at least one interoperable URI encoding scheme for computing an action element from WSDL is defined. An action may be associated with the WSDL definition of an operation using a Policy element; the algorithm used for computing the action element URI from the WSDL definition of the endpoint may also be identified using an attached Policy element. Finally, it is possible to explicitly associate an arbitrary URI with an operation, superseding all declared encoding algorithms. This provides support to bottom-up development models.

[message id]: URI—A URI that uniquely identifies this message in time and space. In one implementation, no two messages share a [message id] property. The value of this property is an opaque URI.

[relationship]: (QName, URI) (0 . . . unbounded)—A pair of values that indicate how this message relates to another message. The type of the relationship is identified by a QName. The related message is identified by a URI that corresponds to the related message's [message id] property. The message identifier URI may refer to specific message, or be the following a URI that means "unspecified message:"

In one implementation, a predefined relationship of type QName Description is ocmm:Response, which indicates that this is a response to the message identified by the URI.

Dispatching of incoming messages is based on three message 200 properties. The "destination" and "action" fields identify the target processing location and the verb or intent of the message. For request-response operations, the "relates to" field allows distinguishing between the request and response messages.

Exemplary Message Information Header Schema Representation

The message information header(s) 204 provide end-to-end characteristics of a message which can be easily secured as a unit. In this implementation, information in these headers is not modified along a message path. TABLE 8 shows exemplary message information header blocks contents, of which a message may comprise one or more combinations of at least a subset information:

TABLE 8

EXEMPLARY MESSAGE HEADER CONTENTS

| | |
|---|---|
| (1) | <ocmm:MessageID> xs:anyURI </ocmm:MessageID> |
| (2) | <ocmm:RelatesTo RelationshipType= "..."?> xs:anyURI </ocmm:RelatesTo> |
| (3) | <ocmm:To>xs:anyURI</ocmm:To> |
| (4) | <ocmm:Action>xs:anyURI</ocmm:Action> |
| (5) | <ocmm:From>endpoint-reference</ocmm:From> |
| (6) | <ocmm:ReplyTo>endpoint-reference</ocmm:ReplyTo> |
| (7) | <ocmm:FaultTo>endpoint-reference</ocmm:FaultTo> |
| (9) | <ocmm:Recipient>endpoint-reference</ocmm:Recipient> |

The following describes exemplary attributes and elements listed in the schema overview of TABLE 8:

/ocmm:MessageID—This element (of type xs:anyURI) conveys the [message id] property.

/ocmm:RelatesTo—This (repeating) element information item contributes one abstract [relationship] property value, in the form of a (URI, QName) pair. The [children] property of this element (which is of type xs:anyURI) conveys the [message id] of the related message /ocmm:RelatesTo/@RelationshipType—This attribute (of type xs:QName) conveys the relationship type as a QName. When absent, the implied value of this attribute is ocmm:Response.

/ocmm:ReplyTo—This element (of type ocmm:EndpointReferenceType) provides the value for the [reply endpoint] property.

/ocmm:From—This element (of type ocmm:EndpointReferenceType) provides the value for the [source endpoint] property.

/ocmm:FaultTo—This element (of type ocmm:EndpointReferenceType) provides the value for the [fault endpoint] property.

/ocmm:To—This element (of type xs:anyURI) provides the value for the [destination] property—When generated from an endpoint reference the endpoint address is bound to this element.

/ocmm:Action—This element of type xs:anyURI conveys the [action] property. The [children] of this element convey the value of this property.

/ocmm:Recipient—This element (of type ocmm:EndpointReferenceType) conveys the entire endpoint reference of the recipient. Senders MAY elect to add this header as a processing hint to downstream nodes.

Messages generated in response to a message 200 containing message information header blocks contain message information header blocks in the reply message. For purposes of illustration, such response messages are shown as a respective portion of program data 137 of FIG. 1.

The example of TABLE 9 shows exemplary use of message information header blocks 204 in a message 200:

TABLE 9

EXEMPLARY USE OF MESSAGE BLOCKS IN A SOAP MESSAGE

```
<S:Envelope xmlns:S="http://www.w3.org/2002/12/soap-envelope"
    xmlns:ocmm="http://schemas.xmlsoap.org/ws/2003/03/addressing"
    xmlns:f123="http://www.fabrikam123.com/svc53"
>
  <S:Header>
    <ocmm:MessageID>uuid:aaaabbbb-cccc-dddd-eeee-ffffffffffff
    </ocmm:MessageID>
    <ocmm:RelatesTo>uuid:11112222-3333-4444-5555-666666666666
    </ocmm:RelatesTo>
    <ocmm:ReplyTo>
      <ocmm:Address>http://business456.com/client1</ocmm:
      Address>
    </ocmm:ReplyTo>
    <ocmm:FaultTo>
      <ocmm:Address>http://business456.com/deadletters</ocmm:
      Address>
    </ocmm:FaultTo>
    <ocmm:To S:mustUnderstand="1">mailto:joe@
    fabrikam123.com</ocmm:To>
    <ocmm:Action>http://fabrikam123.com/mail#Delete</ocmm:
    Action>
  </S:Header>
  <S:Body>
    <f123:Delete>
      <maxCount>42</maxCount>
    </f123:Delete>
  </S:Body>
</S:Envelope>
```

The exemplary message of TABLE 9 has the following property values:

[destination] The URI mailto:joe@fabrikam123.com.
[reply endpoint] The endpoint with [address] http://business456.com/client1.
[fault endpoint] The endpoint with [address] http://business456.com/deadletters.
[action] http://fabrikam123.com/mail#Delete.
[message id] uuid:aaaabbbb-cccc-dddd-eeee-ffffffffffff.
[relationship] (ocmm:Response,uuid: 11112222-3333-4444-5555-666666666666).
[ocmm:RelatesTo/@RelationshipType]—This attribute (of type xs:QName) conveys the relationship type as a QName. When absent, the implied value of this attribute is ocmm:Response.
[ocmm:ReplyTo]—This element (of type ocmm:EndpointReferenceType) provides the value for the [reply endpoint] property.
[ocmm:FaultTo]—This element (of type ocmm:EndpointReferenceType) provides the value for the [fault endpoint] property.

For additional information regarding endpoints and message information headers, please refer also to http://msdn.microsoft.com/library/default.asp?url=/library/en-us/dnglobspec/html WS-Addressing.asp, copyright 2002-2003, published Mar. 13, 2003, and hereby incorporated by reference.

Transport Neutral Addressing

As shown in the previous examples, a message 200 based on OCM-Messaging has address information for message source, recipient, endpoint, and action in the data representation and protocol used to send the message 200. In this implementation, a SOAP binding was used to bind the endpoint, providing a self-contained SOAP envelope, which is not bound to a particular transport mechanism. Referring to the example of TABLE 3, the illustrated SOAP message 204 with OCM-Messaging headers 204 contains all the information necessary to transmit the SOAP message to the target machine (e.g., remote computer 10 of FIG. 1) using any number of protocols. Once at the target machine, a message processor may then examine the message, determine the endpoint address and SOAP action, and dispatch it to the proper message handler.

TABLE 8 shows the exemplary message 200 of TABLE 3 transmitted using SMTP.

TABLE 10

EXEMPLARY TRANSPORT NEUTRAL OCM-MESSAGING

```
X-Message-Info: JGTYoYF78jEHjJx36Oi8+Q1OJDRSDidP
X-MimeOLE: Produced By Microsoft Exchange V6.5.6895.0
Received: from sender.business456.com ([131.107.3.2])
    by msg.fabrikam123.com with Microsoft SMTPSVC(5.0.2195.5600);
    Sun, 1 Jun 2003 12:33:36 -0700
MIME-Version: 1.0
Content-Type: text/plain;
    charset="us-ascii"
Content-Transfer-Encoding: quoted-printable
Content-class: urn:content-classes:message
Subject: A SOAP Message
Date: Sun, 1 Jun 2003 12:17:10 -0700
Message-ID:
<4DC0050DD0FB0C468E37666BD52923E60AE1707F@
msg.busines456.com>
X-MS-Has-Attach:
X-MS-TNEF-Correlator:
Thread-Topic: A SOAP Message
Thread-Index: AcMU8+
84Gz3zcFVASyiEG9vpls9O4QTfFvbAAABTB1A=
From: "Chris Smith" <chriss@business456.com>
To: "Purchasing" purchasing@fabrikam123.com
Return-Path: chriss@business456.com
X-OriginalArrivalTime:    01    Jun    2003    19:33:35.0945
(UTC)
FILETIME=[B1B80390:01C32874]
<?xml version=3D"1.0" encoding=3D"utf-8"?>
<S:Envelope xmlns:S=3D"http://www.w3.org/2002/12/soap-envelope"
        xmlns:ocmm=3D"http://schemas.xmlsoap.org/ws/
        2003/03/addressing">
    <S:Header>
        <ocmm:From>
            <ocmm:Address>http://business456.com/OrderMgr</
            ocmm:Address>
        </ocmm:From>
        <ocmm:ReplyTo>
            <ocmm:Address>http://business456.com/OrderMgr</ocmm:
            Address>
        </ocmm:ReplyTo>
        <ocmm:To>http://fabrikam123.com/Purchasing</ocmm:To>
        <ocmm:Action>http://fabrikam123.com/SubmitPO</ocmm:
        Action>
    </S:Header>
    <S:Body xmlns:po=3D
        "http://schemas.microsoft.com/examples/2003/05/
        PurchaseOrder">
        <po:PurchaseOrder>
        ...
        </po:PurchaseOrder>
    </S:Body>
</S:Envelope>
```

Referring to TABLE 10, there is no correlation needed between the transport-level address and the addressing used within the SOAP message 200. For example, the SMTP From address is "Chris Smith" <chrisss@business456.com>, while the OCM-Messaging ReplyTo address is http://business456.com/OrderMgr. This same message can be sent via a range of transports. For example, it could be delivered using a reliable messaging subsystem like Microsoft MSMQ or the IBM MQ Series, or through a publish-and-subscribe system.

Support for Intermediaries

Once a message 200 is transmitted by computing device 110 using a communication subsystem such as a network protocol stack or more sophisticated system like email, the receiving computing device (e.g., remote computer 180) can examine the message and determine how to process it further. In many cases, the receiving system will be able to process the message by handling the request directly and sending back a response. Alternatively the receiving system may pass the message on to another system for further processing. In such cases we refer to the system that will do this forwarding operation as an intermediary.

For example, in the case of the email system implementation of system 100, after a message 200 is received, an intermediary can examine the addressing information within the message and then dispatch the message to a standard Web services application using the HTTP request/response model.

Figure 3:
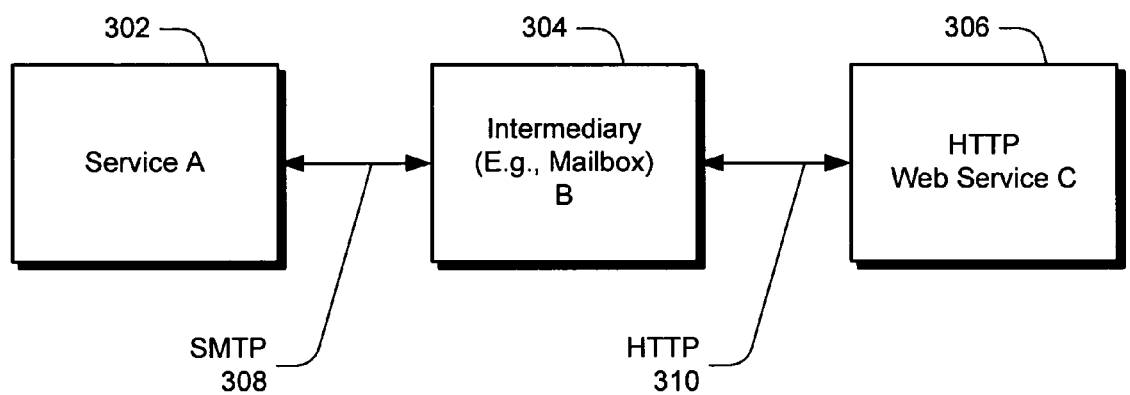
FIG. 3 shows an exemplary system for transport decoupled addressing using an HTTP request/response model.

FIG. 3 shows an exemplary system 300 for transport decoupled addressing using an HTTP request/response model. System 300 is an exemplary implementation of system 100 of FIG. 1, wherein service A 203, intermediary 304, and HTTP Web service C respectively represent a computing device 110 and/or remote computer 180 of FIG. 1. Because OCM-Messaging places the addressing information and action in the SOAP envelope, the message 200 can easily and safely flow across intermediaries 304 such as gateways, routers, and so on. In addition, because the addressing and action information in an endpoint reference 202 (FIG. 2) are bound to the message 200 as SOAP headers, any number of different security mechanisms can be used to ensure the integrity and confidentiality of the message even in the presence of intermediaries. Message integrity and confidentially in the presence of intermediaries is particularly useful when the intermediary forwards messages. Notice that in the exemplary implementation of FIG. 3, Web Service C 306 is receiving an HTTP request 310 from the Intermediary B 304, the request originating as an SMTP message 308 from Service A 302. If we use today's standard Web authorization mechanisms, Web Service C would incorrectly determine that the request originated from B. However, with OCM-Messaging combined with WS-Security, Web Service C 306 can correctly determine that Service A 302 originated the message.

The following example of TABLE 11 shows an exemplary message 200 based on OCM-Messaging, wherein the OCM-Messaging headers and body have been signed (some line breaks have been inserted for readability):

TABLE 11

AN EXEMPLARY SIGNED MESSAGE BASED ON OCM-MESSAGING

```
<?xml version="1.0" encoding="utf-8"?>
<S:Envelope xmlns:S="http://www.w3.org/2002/12/soap-envelope"
        xmlns:ocmm="http://schemas.xmlsoap.org/ws/2003/03/addressing"
        xmlns:wsu="http://schemas.xmlsoap.org/ws/2002/07/utility"
        xmlns:sec="http://schemas.xmlsoap.org/ws/2003/06/secext">
    <S:Header>
        <ocmm: From
        wsu:Id="Id-5cc9404a-be0a-7c1f-a6e4-62aa0f5e430b">
            <ocmm:Address>http://business456.com/OrderMgr</ocmm:
            Address>
        </ocmm: From>
        <ocmm:ReplyTo>
```

TABLE 11-continued

AN EXEMPLARY SIGNED MESSAGE BASED ON
OCM-MESSAGING

```
    wsu:Id="Id-7ed9101f-ce9f-4c2f-b5c9-92bb0f5e510d">
    <ocmm:Address>http://business456.com/OrderMgr</ocmm:
    Address>
  </ocmm:ReplyTo>
  <ocmm:To>
    wsu:Id="Id-05660387-c6e0-4953-a532-101aa4c49511">
    http://fabrikam123.com/Purchasing
  </ocmm:To>
  <ocmm:Action>
    wsu:Id="Id-e9517097-5d3e-43d3-840b-457003328024"
    >http://fabrikam123.com/SubmitPO</ocmm:Action>
  <sec:Security>
    <!-- WS-Security signature of Body, To, -->
    <!-- Action and From goes here. -->
    ...
  </sec:Security>
  </S:Header>
  <S:Body wsu:Id="Id-fa4ed0c0-447e-43cc-b391-
    af2859f3b1e7" xmlns:po=
      "http://schemas.microsoft.com/examples/2003/05/PurchaseOrder">
    <po:PurchaseOrder>
    ...
    </po:PurchaseOrder>
  </S:Body>
</S:Envelope>
```

Support for Asynchronous Messaging and Notifications

As described above, when using SOAP messaging in a conventional network communication system over HTTP, the response to the message is delivered back to the sender using the open HTTP connection. In many cases it would be useful to be able to transmit the message back to the sender using other mechanisms. For example, it might take a long time to compute the response to the request and the HTTP connection might time out during that interval. Also, in some cases it would be useful to be able to send more than one response message. Additionally, the incoming request might have been forwarded through an intermediary and if the connectivity allows for it, it would be more efficient to send directly to the original requestor rather than sending the response back through the intermediary. In another example, it may be useful to send a response and/or fault message to a third party that is independent of the message sender.

To support these scenarios OCM-Messaging of system 100 (FIG. 1) provides support for a "return address" known as the ReplyTo element, and a fault endpoint property ("FaultTo") identifying an intended receiver for a fault related to a message. For instance, see lines (006) through (011) of TABLE 3. The ReplyTo element contains the information the recipient of the message can use to send responses. One particularly interesting aspect of the ReplyTo element is that it contains both address information and an element known as the ReferenceProperties element. The ReferenceProperties element can be used by the send or the reference properties to ensure that a response message contains additional information that the sender can use for anything as a function of the sender's implementation (e.g., to correlate a response, to accelerate processing, to determine whether data corruption has happened, and/or so on).

Figure 4:
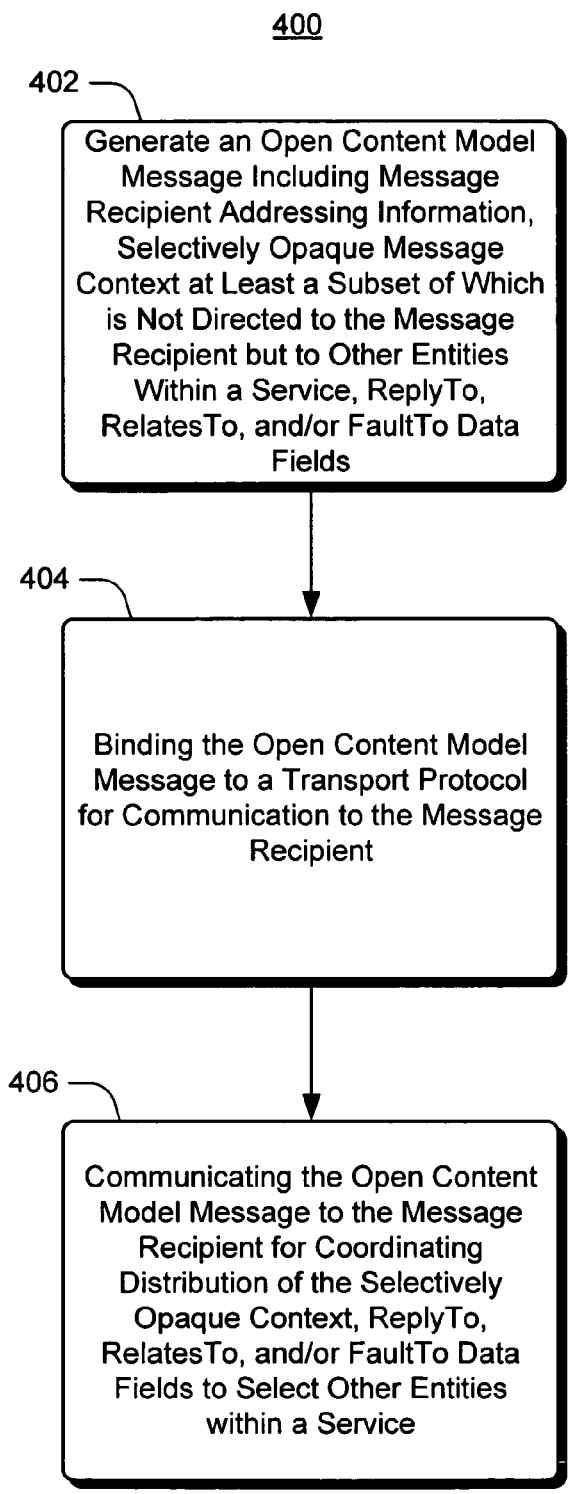
FIG. 4 illustrates an exemplary procedure for open content model Web service messaging.

With respect to the FaultTo element, see line 7 of TABLE 8. The FaultTo element contains the information a recipient of a message can use to send responses to a specific entity (fault endpoint) when there is a fault associated with the message. An Exemplary Procedure FIG. 4 illustrates an exemplary procedure 400 for open content model Web service messaging. For purposes of discussion, operations of the procedure 400 are discussed in relation to aspects of FIGS. 1-3. (All reference numbers begin with the number of the drawing in which the component is first introduced). Additionally, computing device 110 of FIG. 1 is described in this exemplary procedure as generating and communicating a transport neutral message 200 to an endpoint, which for purposes of illustration is described as being remote computer 180. As part of the normal communication flow of message 202 to the endpoint, the message 200 may pass-through any number of intermediary computing devices (e.g., a Web Service 304) that are TMS-Addressing enabled such as gateways, routers, Web services, endpoint managers, and/or the like.

At block 402, computing device 110 generates an open content model (OCM) transport neutral message 200. The OCM message 200 includes message recipient addressing information, selectively opaque message context (at least a subset of which is not directed to the message recipient but to other entities within a service), ReplyTo, RelatesTo, and/or FaultTo data fields. At block 404, the OCM message 200 is bound to a transport protocol for communication to the message recipient. When the OCM message is bound to a SOAP message, or the like, the procedure provides an interoperable, transport independent approach to communicating selectively opaque message context to a message originator/source, message senders, and/or message receivers. This includes a fine grained approach to identifying specific elements within a service that originate, send, or should receive a message.

At block 406, the OCM message 200 is communicated to the message recipient for coordinating distribution of the selectively opaque context, ReplayTo, RelatesTo, and/or FaultTo data fields to select other entities within the service.

CONCLUSION

Although the systems and methods for us for OCM-Messaging have been described in language specific to structural features and/or methodological operations or actions, it is understood that the implementations defined in the appended claims are not necessarily limited to the specific features or actions described. Rather, the specific features and actions are disclosed as exemplary forms of implementing the claimed subject matter.

The invention claimed is:

1. A method for open content model Web service messaging in a networked computing environment, the method comprising:

generating a transport neutral message comprising message recipient information, endpoint addressing information, and one or more reference properties comprising selectively opaque message context, the addressing information and selectively opaque message context are respectfully specified by an endpoint reference and message information headers, the message information headers further comprising a reply-to property identifying an intended recipient for a reply to the transport neutral message, a relates-to property that indicates how the transport neutral message relates to a different transport neutral message, at least one of the one or more reference properties to ensure that the reply-to property contains additional information to provide one or more functions related to a sender's implementation, and a fault-to property that is used to send one or more responses to a specific entity when there is a fault associated with the message, wherein the selectively opaque message context is based on an Extended Markup Language (XML) messaging protocol;

binding the transport neutral message to a transport protocol for communication to the message recipient, wherein binding the transport protocol is based on Simple Object Access Protocol (SOAP); and wherein at least a portion of the selectively opaque message context is not directed to the message recipient.

2. A method as recited in claim 1, wherein the selectively opaque context directs an endpoint to send one or more responses to a message source, the message source not being the message recipient.

3. A method as recited in claim 1, wherein the message recipient is a service coordinator.

4. A method as recited in claim 1, wherein the addressing information and selectively opaque message context are respectfully specified by an endpoint reference and message information headers.

5. A method as recited in claim 4, wherein the endpoint reference is self-contained service endpoint description.

6. A method as recited in claim 4, wherein the endpoint reference and/or message information headers provide identification and description of specific service instances and/or specific instance details.

7. A method as recited in claim 4, wherein the message information headers further comprise a reply to property identifying an intended recipient for a reply to the transport neutral message, a relates to property that indicates how the transport neutral message relates to a different transport neutral message.

8. A computer-readable storage medium comprising computer-program instructions for open content model Web service messaging in a networked computing environment, the computer-program instructions being executable by a processor for:

generating a transport neutral message comprising message recipient information, endpoint addressing information, and one or more reference properties comprising selectively opaque message context, the addressing information and selectively opaque message context are respectfully specified by an endpoint reference and message information headers, the message information headers further comprising a reply-to property identifying an intended recipient for a reply to the transport neutral message, a relates-to property that indicates how the transport neutral message relates to a different transport neutral message, at least one of the one or more reference properties to ensure that the reply-to property contains additional information to provide one or more functions related to a sender's implementation, and a fault-to property that is used to send one or more responses to a specific entity when there is a fault associated with the message, wherein the selectively opaque message context is based on an Extended Markup Language (XML) messaging protocol;

binding the transport neutral message to a transport protocol for communication to the message recipient, wherein binding the transport protocol is based on Simple Object Access Protocol (SOAP); and wherein at least a portion of the selectively opaque message context is not directed to the message recipient.

9. The computer-readable storage medium as recited in claim 8, wherein the selectively opaque context directs an endpoint to send one or more responses to a message source, the message source not being the message recipient.

10. The computer-readable storage medium as recited in claim 8, wherein a portion of the selectively opaque context directs the message recipient as to how to handle one or more messages sent to the endpoint in a session.

11. The computer-readable storage medium as recited in claim 8, wherein the message recipient is a service coordinator.

12. The computer-readable storage medium as recited in claim 8, wherein the endpoint reference is self-contained service endpoint description.

13. The computer-readable storage medium as recited in claim 8, wherein the endpoint reference and/or message information headers provide identification and description of specific service instances and/or specific instance details.

14. A computing device comprising:

a processor; and a memory coupled to the processor, the memory comprising computer-program instructions executable by the processor for open content model messaging in a networked computing environment, the computer-program instructions comprising instructions for:

generating a transport neutral message comprising message recipient information, endpoint addressing information, and one or more reference properties comprising selectively opaque message context, wherein a portion of the selectively opaque context directs a message recipient as to how to handle one or more messages sent to the endpoint in a session, and further wherein the addressing information and selectively opaque message context are respectfully specified by an endpoint reference and message information headers, the message information headers further comprising a reply-to property identifying an intended recipient for a reply to the transport neutral message, a relates-to property that indicates how the transport neutral message relates to a different transport neutral message, at least one of the one or more reference properties to ensure that the reply-to property contains additional information to provide one or more functions related to a sender's implementation and a fault-to property that is used to send one or more responses to a specific entity when there is a fault associated with the message, wherein the selectively opaque message context is based on an Extended Markup Language (XML) messaging protocol;

binding the transport neutral message to a transport protocol for communication to the message recipient, wherein binding the transport protocol is based on Simple Object Access Protocol (SOAP); and wherein at least a portion of the selectively opaque message context is not directed to the message recipient.

15. A computing device as recited in claim 14, wherein the selectively opaque context directs an endpoint to send one or more responses to a message source, the message source not being the message recipient.

16. A computing device as recited in claim 14, wherein a portion of the selectively opaque context directs the message recipient as to how to handle one or more messages sent to the endpoint in a session.

17. A computing device as recited in claim 14, wherein the message recipient is a service coordinator.

18. A computing device as recited in claim 14, wherein the endpoint reference is self-contained service endpoint description.

19. A computing device as recited in claim 14, wherein the endpoint reference and/or message information headers provide identification and description of specific service instances and/or specific instance details.

20. A computing device comprising:
a processor; and
a memory coupled to the processor;
an open content model (OCM) messaging component stored in the memory and executed on the processor to:
generate a transport neutral message comprising message recipient information, endpoint addressing information, and one or more reference properties comprising selectively opaque message context, the addressing information and selectively opaque message context are respectfully specified by an endpoint reference and message information headers, the message information headers further comprising a reply-to property identifying an intended recipient for a reply to the transport neutral message, a relates-to property that indicates how the transport neutral message relates to a different transport neutral message, at least one of the one or more reference properties to ensure that the reply-to property contains additional information to provide one or more functions related to a sender's implementation, and a fault-to property that is used to send one or more responses to a specific entity when there is a fault associated with the message, wherein the selectively opaque message context is based on an Extended Markup Language (XML) messaging protocol;
bind the transport neutral message to a transport protocol for communication to the message recipient, wherein binding the transport protocol is based on Simple Object Access Protocol (SOAP); and
wherein at least a portion of the selectively opaque message context is not directed to the message recipient.

21. A computing device as recited in claim 20, wherein the selectively opaque context directs an endpoint to send one or more responses to a message source, the message source not being the message recipient.

22. A computing device as recited in claim 20, wherein the message recipient is a service coordinator.

23. A computer-readable storage medium, wherein the medium does not include a signal, comprising computer-program instructions executable by a processor for implementing an open content model data structure thereon, the open content model data structure comprising:
a message recipient data field;
an endpoint addressing data field; and
one or more reference properties data fields comprising selectively opaque message context, at least a portion of the selectively opaque message context is not directed to the message recipient,
wherein the endpoint addressing data field and selectively opaque message context are respectfully specified by an endpoint reference and message information headers, the message information headers further comprising a reply-to property identifying an intended recipient for a reply to the transport neutral message, a relates-to property that indicates how the transport neutral message relates to a different transport neutral message, at least one of the one or more reference properties to ensure that the reply-to property contains additional information to provide one or more functions related to a sender's implementation, and a fault-to property that is used to send one or more responses to a specific entity when there is a fault associated with the message, wherein the selectively opaque message context is based on an Extended Markup Language (XML) messaging protocol,
wherein the transport neutral message is bound to a transport protocol for communication to the message recipient, the transport protocol being based on Simple Object Access Protocol (SOAP).

24. The computer-readable storage medium as recited in claim 23, wherein the selectively opaque context directs an endpoint to send one or more responses to a message source, the message source not being the message recipient.

* * * * *